(12) United States Patent
Lin et al.

(10) Patent No.: US 7,962,627 B2
(45) Date of Patent: Jun. 14, 2011

(54) PEER-TO-PEER NETWORK ADDRESS TRANSLATOR (NAT) TRAVERSAL TECHNIQUES

(75) Inventors: Qingwei Lin, Beijing (CN); Jiang Li, Beijing (CN); Jian-guang Lou, Beijing (CN); Yusuo Hu, Beijing (CN); Fan Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/328,214

(22) Filed: Dec. 4, 2008

(65) Prior Publication Data

US 2010/0146126 A1 Jun. 10, 2010

(51) Int. Cl.
*G06F 15/16* (2006.01)
(52) U.S. Cl. .......................................... 709/227; 709/228
(58) Field of Classification Search .................. None
See application file for complete search history.

(56) References Cited

U.S. PATENT DOCUMENTS

| 5,586,257 | A | * | 12/1996 | Perlman ....................... 709/228 |
| 7,227,864 | B2 | * | 6/2007 | Collins et al. ................. 370/392 |
| 7,441,270 | B1 | * | 10/2008 | Edwards et al. ............. 709/227 |
| 2004/0148406 | A1 | | 7/2004 | Shima ........................... 709/228 |
| 2005/0071481 | A1 | * | 3/2005 | Danieli ......................... 709/229 |
| 2006/0075127 | A1 | * | 4/2006 | Juncker et al. ............... 709/229 |
| 2006/0203750 | A1 | | 9/2006 | Ravikumar et al. |
| 2006/0215684 | A1 | | 9/2006 | Capone |
| 2007/0076729 | A1 | | 4/2007 | Takeda |
| 2007/0253418 | A1 | * | 11/2007 | Shiri et al. ................... 370/392 |
| 2008/0062978 | A1 | | 3/2008 | Hwang et al. |
| 2008/0198850 | A1 | | 8/2008 | Cooper et al. |
| 2008/0201480 | A1 | | 8/2008 | He et al. |
| 2008/0232362 | A1 | | 9/2008 | Miyajima et al. |
| 2008/0288580 | A1 | * | 11/2008 | Wang et al. .................. 709/203 |

(Continued)

FOREIGN PATENT DOCUMENTS

EP 1959645 A1 8/2008

OTHER PUBLICATIONS

Ganjam et al., Overcoming NAT And Firewall Connectivity Restrictions in Overlay Multicast, Mar. 2005, International Journal of Intelligent Control and Systems, vol. 10, No. 1, pp. 1-10.*

(Continued)

*Primary Examiner* — Hassan Phillips
(74) *Attorney, Agent, or Firm* — Lee & Hayes, PLLC

(57) ABSTRACT

Techniques described herein perform network address translator (NAT) traversal using a peer of a peer-to-peer architecture in lieu of a server. A first peer maintains a list of public domain peers that are not hidden behind a NAT or a firewall and have previously been connected with the first peer. The first peer distributes the list to other peers via a gossip-based protocol. When a second peer desires to connect with the first peer, the second peer initiates a connection with the first peer and sends a request to a public domain peer of the list, requesting that the public domain peer instruct the first peer to initiate a connection with the second peer. By leveraging a public domain peer to establish a connection between the first and second peers, these techniques lessen the burden on the server of the architecture. Furthermore, because different peers may make requests to different public domain peers, the techniques allow for better scalability of the architecture.

19 Claims, 7 Drawing Sheets

U.S. PATENT DOCUMENTS

2009/0028167 A1* 1/2009 Takeda et al. .................. 370/401
2009/0296606 A1* 12/2009 Ravikumar et al. ........... 709/228
2010/0077087 A1* 3/2010 Roy et al. ...................... 709/228

OTHER PUBLICATIONS

Ford, et al, "Peer-to-Peer (P2P) Communication across Middleboxes", retrieved on Oct. 30, 2008 at <<http://tools.ietf.org/html/draft-ford-midcom-p2p-01>>, RFC Editor, The Internet Society, 2003, pp. 1-26.

Freedman, et al., "Tarzan: A Peer-to-Peer Anonymizing Network Layer", retrieved on Oct. 29, 2008 at <<http://www.cs.princeton.edu/~mfreed/docs/tarzan-ccs02.pdf>>, ACM CCS'02 (1-58113-612-9/02/0011), 2002, pp. 121-129.

Ganguly, et al., "IP Over P2P: Enabling Self-configuring Virtual IP Networks for Grid Computing", retrieved on Oct. 29, 2008 at <<http://byron.acis.ufl.edu/papers/ipdps06ipop.pdf>>, IEEE Parallel and Distributed Processing Symposium (IPDPS), 2006, pp. 30-40.

"Gossip Protocol", retrieved on Oct. 30, 2008 at <<http://en.wikipedia.org/wiki/Gossip_protocol>>, Wikipedia, pp. 1-4.

Rosenberg, et al., "STUN—Simple Traversal of User Datagram Protocol (UDP) through Network Address Translators (NATs)", retrieved on Oct. 29, 2008 at <<http://www.ietf.org/rfc/rfc3489.txt>>, RFC Editor, The Internet Society, 2003, pp. 1-44.

Wacker, et al., "A NAT Traversal Mechanism for Peer-To-Peer Networks", retrieved on Oct. 29, 2008 at <<http://pap.vs.uni-due.de/files/wacker-nat-traversal.pdf>>, IEEE Conference on Peer-to-Peer Computing (P2P), 2008, pp. 81-83.

* cited by examiner

PEER-TO-PEER NETWORK ADDRESS TRANSLATOR (NAT) TRAVERSAL TECHNIQUES

BACKGROUND

A peer-to-peer architecture comprises a multitude of interconnected peers, some of which reside behind a network address translator (NAT) and/or a firewall. When a first peer desires to connect with a second peer that resides behind a NAT and/or a firewall, the first peer must somehow traverse through the NAT and/or firewall. Existing NAT traversal techniques leverage a server of the peer-to-peer architecture to perform the NAT traversal. However, these existing techniques contain several drawbacks. First, the existing techniques place a large overhead on the server of the peer-to-peer to architecture. Furthermore, because the peers rely upon the server, the existing techniques do not scale well in larger peer-to-peer architectures.

SUMMARY

This document describes tools for performing network address translator (NAT) traversal using a peer of a peer-to-peer architecture in lieu of a server of the peer-to-peer architecture. These tools may allow a first peer of the architecture to maintain a list of public domain peers that are not hidden behind a NAT or a firewall. In some instances, the first peer may distribute the maintained list to other peers of the architecture via a gossip-based protocol. When a second peer desires to connect with the first peer of the architecture, the second peer may initiate a connection with the first peer and may send a request to a public domain peer of the list. This request may ask the public domain peer to instruct the first peer to initiate a connection with the second peer. These tools, thus, lighten the overhead placed on the server of the peer-to-peer architecture.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE CONTENTS

The detailed description is described with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
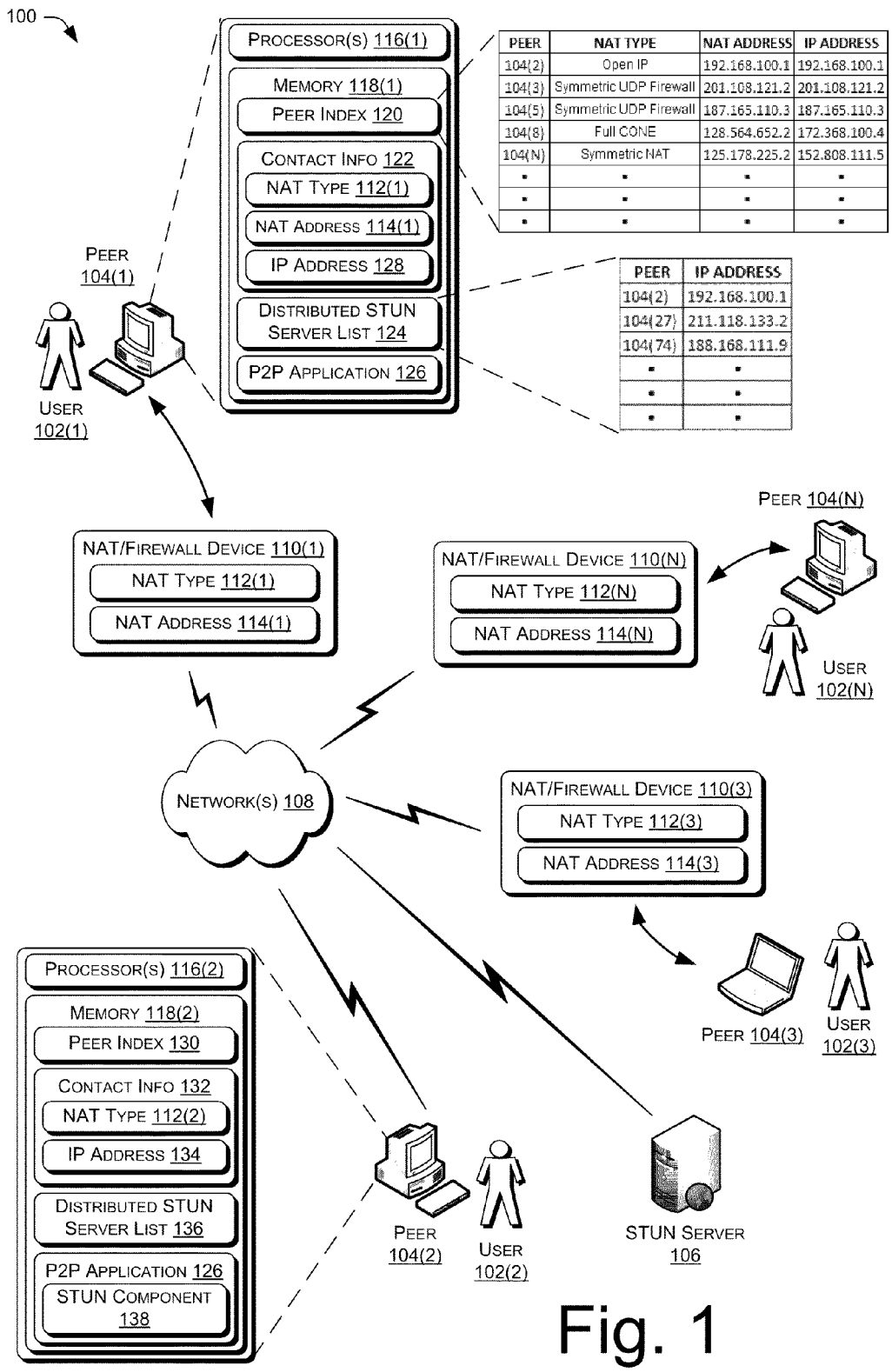
FIG. 1 depicts an illustrative peer-to-peer architecture in which peers may use a public domain peer to connect with other peers. By doing so, the architecture lightens the burden placed on a Simple Traversal of User Datagram Protocol through Network Address Translators (STUN) server of the architecture.

This document describes tools for performing network address translator (NAT) traversal using a peer of a peer-to-peer architecture in lieu of a server of the peer-to-peer architecture. Peer-to-peer applications and protocols often encounter connectivity problems when peers attempt to connect with other peers that are hidden behind a NAT and/or a firewall. To overcome this problem, peers need to perform a "traversal" through the existing NATs and/or Firewalls. This traversal through existing NATs and Firewalls is generally called a "NAT traversal."

Traditionally, a peer-to-peer architecture includes a server, such as a Simple Traversal of User Datagram Protocol through Network Address Translators (STUN) server, which helps perform NAT traversals in order to allow peers of the architecture to connect with one another. That is, the STUN server (or other type of server, depending upon the embodiment) acts as a matchmaker in making connections between peers of the architecture. For example, if a first peer wishes to connect with a second peer, the first peer initiates a connection with the second peer and sends a request to the STUN server. In response, the server sends a message to the second peer, instructing the second peer to initiate a connection with the first peer. With the help of the server, the first and second peers then establish the connection.

This approach, however, has several shortcomings. First, because each peer of the architecture typically requests that the STUN server act as a matchmaker when the respective peer wishes to connect with another peer, the STUN server is often overwhelmed with requests. This results in a large overhead in the system and, therefore, slower connection rates. Furthermore, sending each of these connection requests through a STUN server results in a system that does not scale well as peer-to-peer architectures grow.

The tools described below, meanwhile, leverage public domain peers to implement at least a portion of the functionality traditionally provided by the STUN server. Specifically, when a first peer wishes to establish a connection with a second peer, the first peer may send a request to a public domain peer, who then acts as a matchmaker in establishing the connection between the first and second peers. By leveraging a public domain peer to establish a connection between the first and second peers, these tools lessen the burden on a server (e.g., a STUN server) of the peer-to-peer architecture while only adding a slight burden to peers of the architecture. Furthermore, because different peers may make such requests to different public domain peers, the described tools allow for greater scalability of the architecture.

In some particular embodiments, these tools allow peers of the architecture to each maintain a list of public domain peers that are not hidden behind a NAT or a firewall. The peers may distribute these maintained lists to other peers of the architecture via a gossip-based protocol or via any other suitable protocol. When a peer desires to connect with another peer of the architecture, the peer may initiate a connection with the other peer and may send a request to a public domain peer of the list. This request may ask the public domain peer to instruct the other peer to initiate a connection with the peer that desires to establish the connection. With help from the public domain peer, the two peers may then establish a connection between one another.

The discussion begins with a section entitled "Illustrative Architecture," which describes one non-limiting environment that may implement the claimed tools. A section entitled "Illustrative Flow Diagram" follows and pictorially illustrates a process for maintaining a list of public domain peers, sending this list and peer contact information to other peers of the architecture, and establishing connections with peers by leveraging public domain peers. A third and final section, entitled "Illustrative Processes," describes processes for leveraging a public domain peer of a peer-to-peer architecture for performing NAT traversal techniques in lieu of a server of the architecture.

This brief introduction, including section titles and corresponding summaries, is provided for the reader's convenience and is not intended to limit the scope of the claims, nor the proceeding sections.

Illustrative Architecture

FIG. 1 depicts an illustrative peer-to-peer architecture 100 that may employ the described techniques. As illustrated, architecture 100 includes one or more users 102(1), 102(2), . . . , 102(N) operating peers 104(1), 104(2), . . . , 104(N). Architecture 100 also includes a User Datagram Protocol through Network Address Translators (STUN) server 106. While FIG. 1 illustrates STUN server 106, other environments may employ other types of servers. Peers 104(1)-(N), meanwhile, may comprise an array of computing devices, such personal computers, laptop computers, mobile phones, set-top boxes, game consoles, personal digital assistants (PDAs), portable media players (PMPs) (e.g., portable video players (PVPs) and digital audio players (DAPs)), and the like. Note that a network 108, which couples peers 104(1)-(N) as well as STUN server 106, may comprise the Internet, a Local Area Network (LAN), a Wide Area Network (WAN), a wireless network, and/or the like.

As illustrated, some of peers 104(1)-(N) reside behind one or more Network Addressor Translator (NAT) and/or firewall devices 110(1), . . . , 110(N). For instance, peer 104(1) resides behind NAT/firewall device 110(1), while peers 104(3) and 104(N) reside behind NAT/firewall devices 110(3) and 110(N), respectively. As is known, NAT devices 110(1)-(N) function to receive outgoing messages from an internal internet protocol (IP) address of a peer, modify the IP address in a packet header of a respective message to the NAT address (or to the "external IP address"), and route the message to the specified destination.

In peer-to-peer architecture 100, however, some peers do not reside behind a NAT and/or firewall device. Stated otherwise, these peers are not hidden behind either a NAT or a firewall, and are known as public domain peers. As illustrated, peer 104(2) does not reside behind a NAT or a firewall and, as such, is a public domain peer.

Each of NAT/firewall devices 110(1)-(N) may have a particular NAT type 112(1), . . . , 112(N) and a particular NAT address(es) 114(1), . . . , 114(N). For instance, each device may be one of the following six NAT types: (i) User Datagram Protocol (UDP) Blocked; (2) Symmetric UDP Firewall; (3) Full Cone; (4) Symmetric NAT; (5) Port Restricted, or (6) Restricted Cone. Peers such as peer 104(2) that are not hidden behind a NAT or a firewall, meanwhile, may be deemed to have a NAT type of "Open IP."

As discussed above, when peers 104(1)-(N) wish to connect with one another, these peers must inform the other peers of one another's address(es) and NAT types. As is known, some combinations of NAT types are more compatible with one another. Therefore, by informing other peers of a peer's NAT type, the peers are able to make educated decisions as to which peer or peers to establish a connection with. To do so, the peer must perform a NAT detection method to determine the peer's NAT type. In some instances, each of peers 104(1)-(N) may determine the respective peer's NAT type by performing a STUN protocol with STUN server 106. Once a peer learns of the peer's NAT type and NAT address, the peer may share this information (in addition the peer's internal IP address) to allow other peers to contact the peer, as discussed below. In some instances, one or more of peers 104(1)-(N) may determine the respective peer's NAT type by performing a STUN protocol with a public domain peer, such as peer 104(2).

As illustrated, each of peers 104(1)-(N) includes one or more processors and memory. For instance, FIG. 1 illustrates that peers 104(1) and 104(2) include one or more processors 116(1)-(2) and memory 118(1)-(2), respectively. As illustrated, memory 118(1) stores a peer index 120, contact information 122 associated with peer 104(1), a distributed STUN server list 124, and a peer-to-peer application 126. Peer-to-peer application 126 may comprise any sort of application that allows peer 104(1) to connect with peers 104(2)-(N) for any sort of reason. For instance, application 126 may allow peer 104(1) to share and/or receive music, video or other files with peers 104(2)-(N).

Peer index 120, meanwhile, stores contact information received from other peers 104(2)-(N) of architecture 100. As illustrated, index 120 may store, for each peer from which peer 104(1) has received contact information, an indication of the NAT type of the peer, the NAT address of the peer, and the (internal) IP address of the peer. With use of peer index 120, peer 104(1) may attempt to establish a connection with a peer that appears in the index.

Contact information 122, meanwhile, comprises a NAT type 112(1) of NAT 110(1) that is associated with peer 104(1), a NAT address 114(1) of NAT 110(1) that is associated with peer 104(1), and an internal IP address 128 of peer 104(1). In some instances, peer 104(1) shares contact information 122 with one or more of peers 104(2)-(N) in order to allow these peers to attempt to establish a connection with peer 104(1), should one or more of these peers wish to do so. When one of peers 104(2)-(N) receives contact information 122, this peer may store this information in a local peer index that is similar to peer index 120. In some instances, peer 104(1) may share contact information 122 via a gossip-based protocol, as discussed in more detail below. Furthermore, in some instances, each of peers 104(1)-(N) may share the corresponding peer's contact information via, for example, a gossip-based protocol.

Peer 104(1) may also send, via a gossip-based protocol or otherwise, distributed STUN server list 124 to peers 104(2)-(N), as discussed in detail below. Distributed STUN server list 124 comprises a list of those public domain peers within architecture 100 that peer 104(1) has previously been connected to. As discussed above, public domain peers comprise those peers that are not hidden behind a NAT or a firewall. Also as discussed above, these peers are considered to have a NAT type of "Open IP." Because these public domain peers are not hidden behind a NAT or a firewall, peer 104(1) (as well as other peers within architecture 100) may connect with these peers without having to perform a NAT traversal. Additionally, these public domain peers are able to connect to peer 104(1) without performing a NAT traversal, because they have been connected before and the connection has previously been established.

As discussed above, in traditional peer-to-peer architectures, if peer 104(3) wishes to establish a connection with peer 104(1), peer 104(3) would first initiate a connection with peer 104(1). At the same time, however, peer 104(3) would send a request to STUN server 106, instructing STUN server 106 to instruct peer 104(1) to initiate a connection with peer 104(3). When peer 104(1) receives the instruction, peer 104(1) would indeed initiate a connection with peer 104(3) and a connection would be established. Also as discussed, however, these traditional techniques may place a large overhead on STUN server 106 and, as such, may result in slow connection times. Furthermore, these traditional techniques may scale poorly in large peer-to-peer architectures.

In the instant example of FIG. 1, if peer 104(3) wishes to establish a connection with a peer that is hidden behind a NAT or a firewall (such as peer 104(1)), peer 104(3) may leverage a public domain peer of Distributed STUN server list 124 associated with peer 104(1) (assuming that peer 104(3) has previously received list 124 from peer 104(1)). As illustrated, memory 118(2) of public domain peer 104(2) includes a peer index 130, contact information 132 for peer 104(2), a distributed STUN server list 136, and peer-to-peer application 126. Again, peer index 130 comprises a list of contact information for other peers in architecture 100, while contact information 132 comprises a NAT type 112(2) (Open IP) and an IP address 134 of peer 104(2). Distributed STUN server list 136, meanwhile, comprises a list of public domain peers of which peer 104(2) has previously been connected to. Similar to the discussion of peer 104(1) above, peer 104(2) may share contact information 132 and/or distributed STUN server list 136 with other peers of architecture 100. For instance, peer 104(2) may share this information via a gossip-based protocol.

Peer-to-peer application 126, meanwhile, may comprise the same application that peers 104(1) and 104(3)-(N) store in or run on their respective memories. Again, this application may allow for file sharing, streaming audio or video, or may comprise any other functionality. As illustrated, peer-to-peer application 126 of peer 104(2) includes a STUN component 138. STUN component 138 functions to receive STUN requests from peers of architecture and, in response, send instructions to other peers of the architecture.

For instance, envision that peer 104(3) has previously received contact information 122 and distributed STUN server list 124. Envision also that peer 104(3) wishes to connect with peer 104(1), and that distributed STUN server list 124 (stored on peer 104(1)) includes an indication that peer 104(2) is indeed an Open IP peer. After initiating a connection with peer 104(1), peer 104(3) may send a request to peer 104(2) (an Open IP peer included on list 124 associated with peer 104(1)), instructing peer 104(2) to instruct peer 104(1) to initiate a connection with peer 104(3). That is, peer 104(3) may use another peer (peer 104(2)) as a matchmaker between peers 104(3) and 104(1). When peer 104(2) receives this request from peer 104(3), the public domain peer 104(2) may initiate STUN component 138 of peer-to-peer application 126. Public domain peer 104(2) may then send the instruction to peer 104(1), instructing peer 104(1) to initiate a connection with peer 104(3). After doing so, peers 104(3) and 104(1) may establish a connection, aided by public domain peer 104(2).

By leveraging public domain peers to perform duties typically performed by STUN server 106, the described techniques lighten the burden on STUN server 106. As such, connection times between peers may potentially decrease. Furthermore, because the distributed STUN server lists stored by the peers (e.g., list 124) may contain multiple public domain peers, the peers may send requests to one or more of these peers. By doing so, the techniques spread the burden of establishing connections to multiple entities (namely, the multitude of public domain peers). Additionally, as peer-to-peer architectures grow, the number of public domain peers within the architecture may also grow. The described techniques, therefore, scale extremely well as peer-to-peer architectures grow.

In some instances, a peer such as peer 104(3) may send a request to one public domain peer, while in other instances peer 104(3) may send a request to multiple public domain peers, in hopes that at least one accomplishes the requested task. This may help avoid the possibility that one or more peers are not running (or are "not alive"). Sending this request to multiple public domain peers, therefore, lessens the possibility that the NAT traversal will fail. In still other instances, peer 104(3) may still send a request to STUN server 106 in the event that one or more public domain peers do not respond to the message that peer 104(3) sends.

Figure 2:
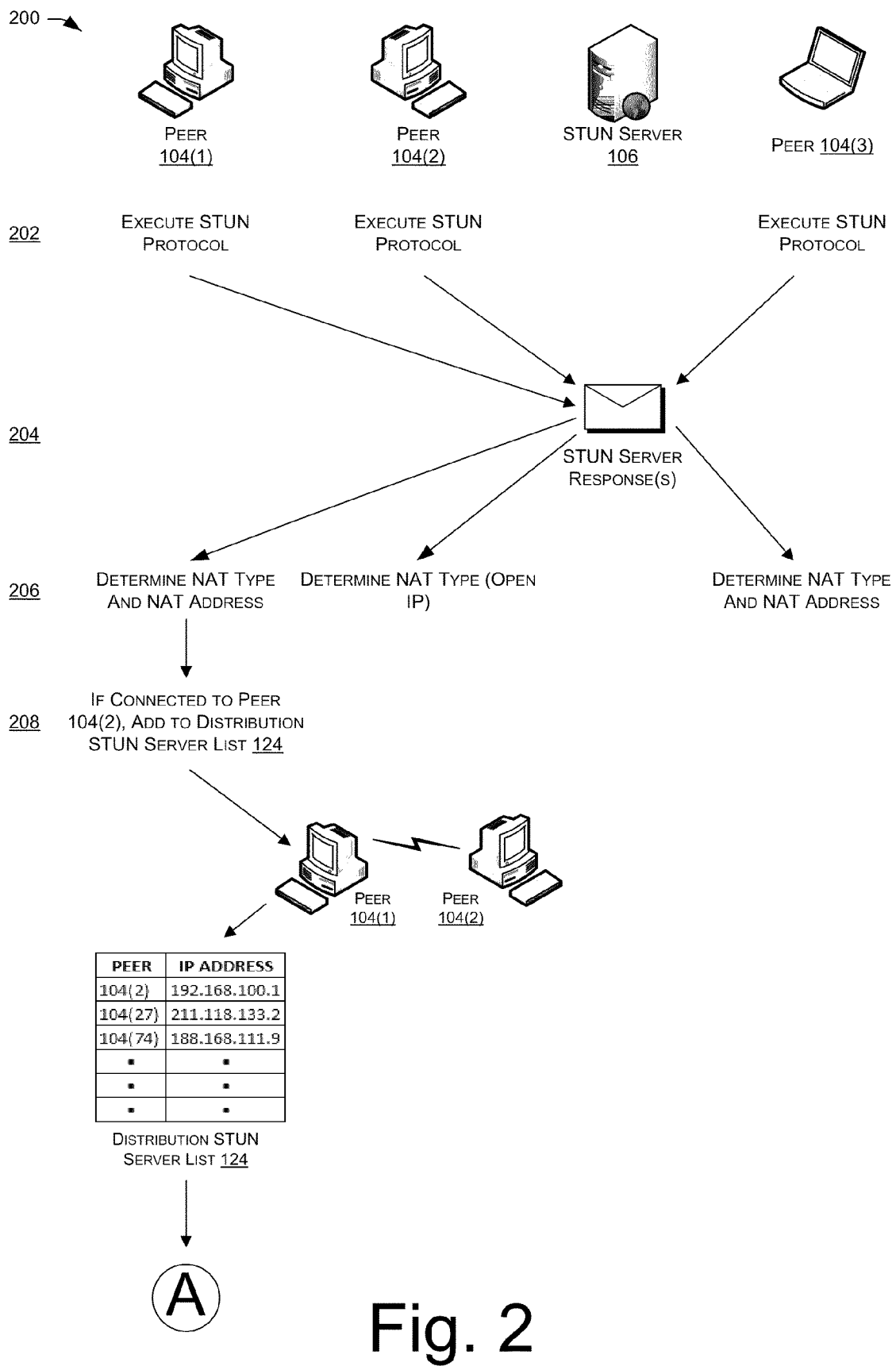
FIGS. 2-4 depicts an illustrative flow diagram that includes a peer conducting a STUN protocol to determine the peer's Network Address Translator (NAT) type and address, sending the peer's contact information and a distributed STUN server list to other peers of the architecture, and connecting with another peer by leveraging a public domain peer of the distributed STUN server list.
Figure 3:
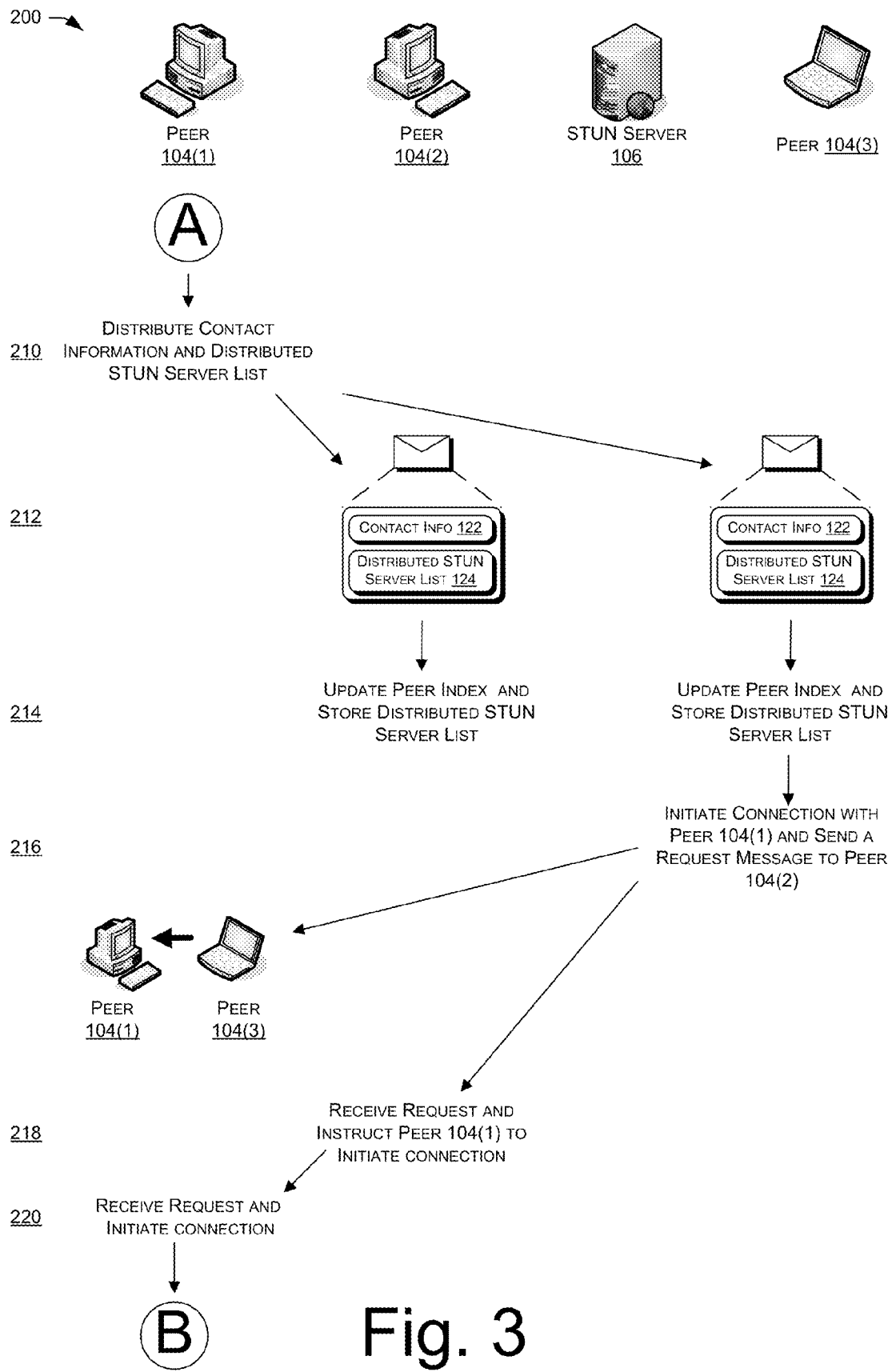
Figure 4:
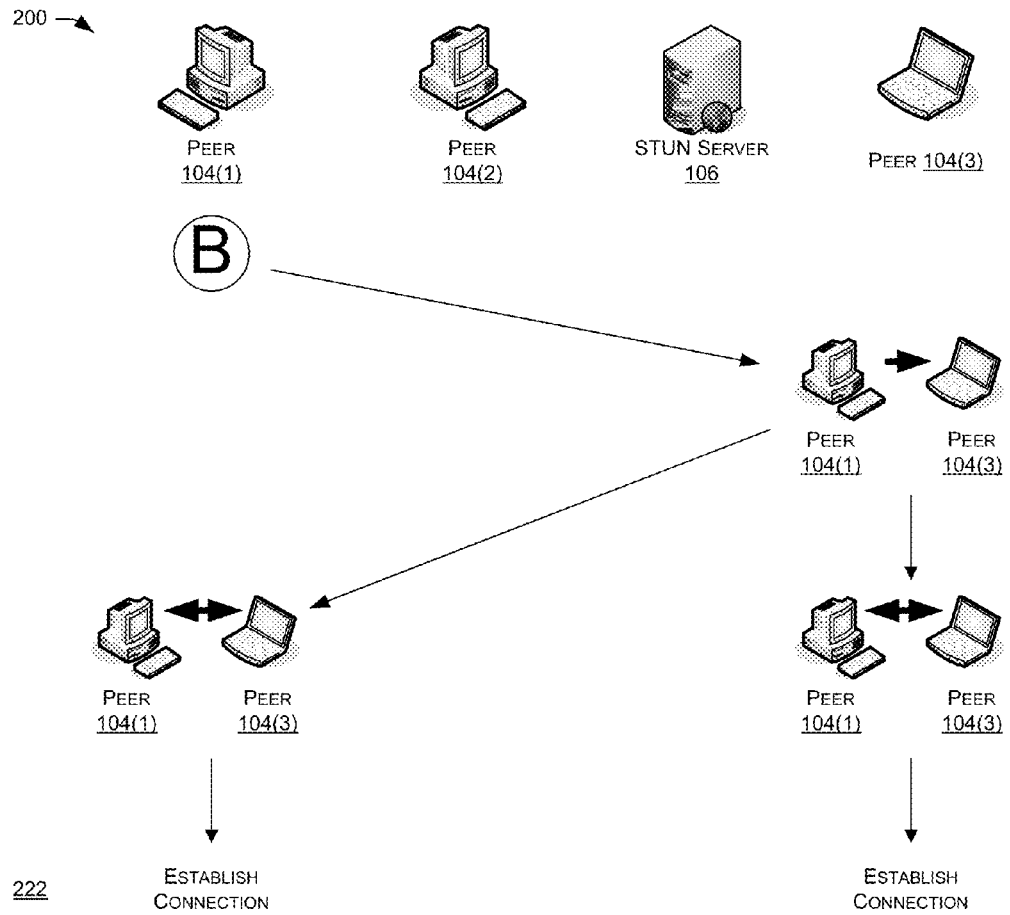

Having described an illustrative peer-to-peer architecture that may implement the described techniques, FIGS. 2-4 illustrates an illustrative flow diagram for connecting peers within this architecture. It is to be appreciated, however, that this architecture is merely illustrated and these techniques may be similarly implemented in an array of other architectures (e.g., non client/server architectures and otherwise).

Illustrative Flow Diagram

FIGS. 2-4 depict an illustrative flow diagram of a process 200 that includes a peer conducting a STUN protocol to determine the peer's NAT type and address, sending the peer's contact information and a distributed STUN server list to other peers of the architecture, and connecting with another peer where the another peer leverages a public domain peer of the distributed STUN server list.

Process 200 begins with operation 202, at which point each of peers 104(1), 104(2) and 104(3) execute a Simple Traversal of User Datagram Protocol through Network Address Translators (STUN) protocol. At operation 204, STUN server may or may not send a response to each of the peers. Based on the response or lack thereof from STUN server 106, each of peers 104(1), 104(2) and 104(3) may determine their corresponding NAT type at operation 206.

Next, operation 208 represents that if peer 104(1) is connected with peer 104(2) (a public domain peer having an Open IP NAT type), peer 104(1) may add peer 104(2) to distributed STUN server list 124. Again, distributed STUN server list 124 contains those public domain peers of which peer 104(1) has previously connected to. In some instances, peer-to-peer application 126 or another entity limits the size of list 124 in order to avoid list 124 from growing too large as peer-to-peer application 126 continues to run and as peer 104(1) becomes aware of more and more public domain peers. For instance, application 126 may limit list 124 to a particular number, with the list comprising the most recently-added public domain peers. In other instances, application 126 may attempt to determine which public domain peers are running (or "alive"), and may attempt to keep these peers on list 124.

FIG. 3 continues the illustration of process 200. At operation 210, peer 104(1) distributes contact information 122 and distributed STUN server list 124 to one or more peers of architecture 100. Here, peer 104(1) distributes contact information 122 and list 124 to, at least, peers 104(2) and 104(3). As discussed above and illustrated by FIG. 1, contact information 122 includes NAT type 112(1) of peer 104(1), NAT address 114(1) of peer 104(1) and IP address 128 of peer 104(1). With use of contact information 122, peers 104(2) and 104(3) may attempt to establish a connection with peer 104(1), should one or both of these peers wish to do so.

Furthermore, while not illustrated, each peer of peer-to-peer architecture may similarly distribute their contact information and distributed STUN server list to peer(s) of architecture. In some instances, each peer of architecture 100 may periodically distribute this information via a gossip-based protocol, which is a protocol that is designed to mimic the way that information spreads when people gossip about some fact. For instance, if peer 104(1) sends contact information 122 and list 124 to peers 104(2) and 104(3), peers 104(2) and 104(3) may each send this information to other peers, who may each send it to two other peers, and so on. As such, a gossip-based protocol allows this contact information and distributed STUN server list to spread extremely robustly.

Returning to FIG. 3, at operation 212 peers 104(2) and 104(3) receive contact information 122 and list 124 and, at operation 214, these peers update their associated peer indexes and store the distributed STUN server list associated with peer 104(1) for potential use in connecting with peer 104(1) in the future. For instance, if contact information 122 includes information that peer indexes of one or both of these peers did not previously store, then one or both of peers 104(2) and 104(3) may update their indexes.

In the illustrated example, peer 104(3) wishes to establish a connection with peer 104(1) with use of the recently-received contact information 122. Therefore, at operation 216, peer 104(3) initiates a connection with peer 104(1) and sends a request to one or more public domain peers stored in the distributed STUN server list of peer 104(1). This request instructs the one or more public domain peers to instruct peer 104(1) to initiate a connection with peer 104(3). In the instant example, peer 104(3) sends this request to, at least, peer 104(2), whom was listed in distributed STUN server list 124 (which peer 104(3) received from peer 104(1)). In some instances, peer 104(3) employs a User Datagram Protocol (UDP) Hole Punching process, although peer 104(3) may employ any other NAT traversal techniques in other instances.

At operation 218, if peer 104(2) is running (or is "alive"), then peer 104(2) receives the request from peer 104(3) and, in response, instructs peer 104(1) to initiate a connection with peer 104(3). Peer 104(1) receives the instruction at operation 220 and, in response, may choose to initiate a connection with peer 104(3). FIG. 4 continues the illustration of process 200, and represents that peers 104(1) and 104(3) establish a connection at operation 222, as both peers have initiated a connection with one another.

In some instances, peers that operate behind a NAT, such as peers 104(1) and 104(3), need to send "keep alive" messages through the NAT in order to maintain the NAT address and port for future communications with peers of architecture 100. Traditionally, these peers send these "keep alive" messages to STUN server 106 in order to keep active the "hole" in the NAT. With use of the described techniques, however, these peers may periodically send these messages to one or more public domain peers. For instance, peer 104(1) could send keep-alive messages to public domain peer 104(2). By doing so, the described techniques further decrease the overhead on STUN server 106.

Illustrative Processes

Figure 5:
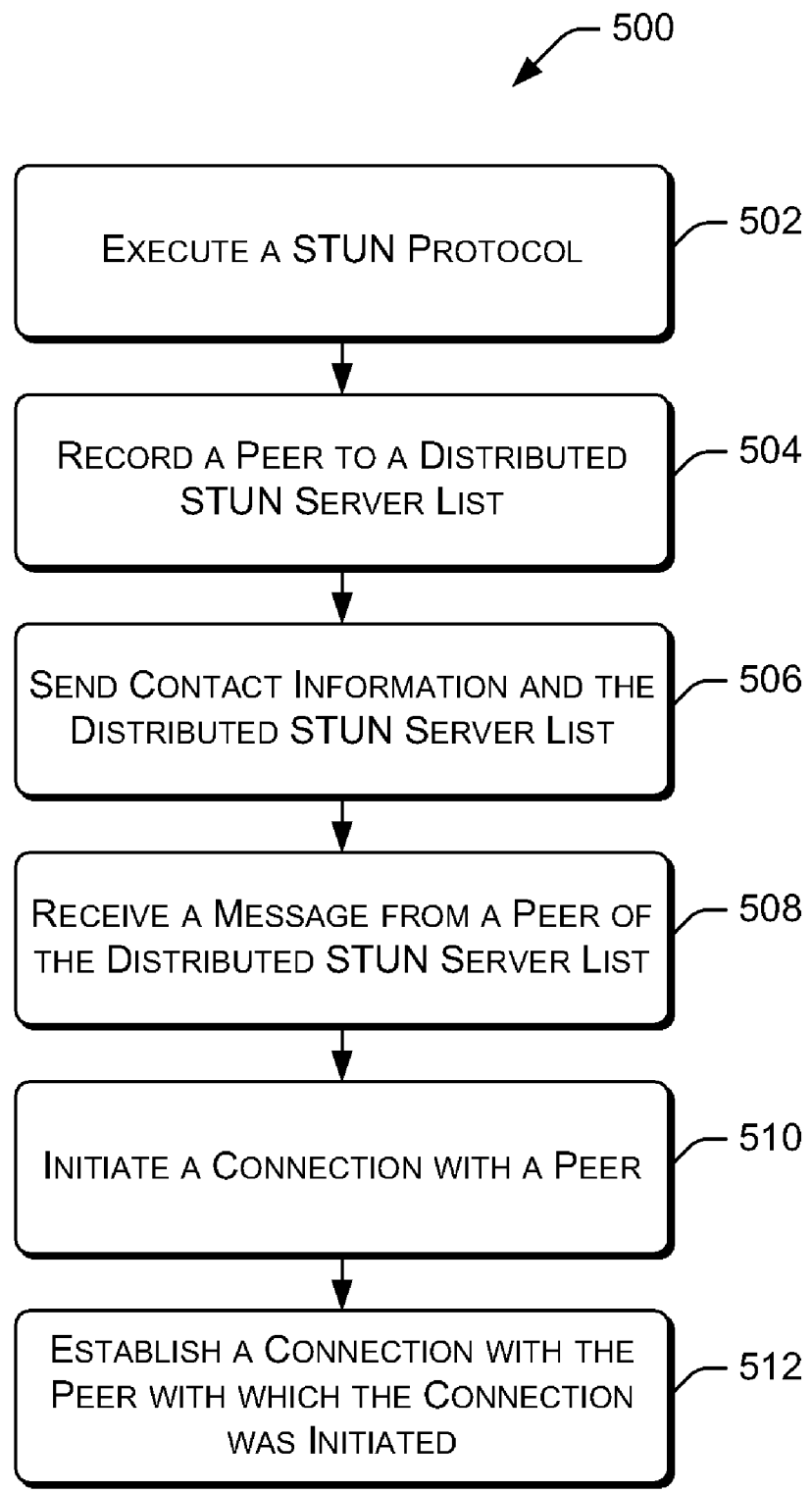
FIGS. 5-7 depict illustrative process for leveraging a public domain peer of a peer-to-peer architecture for performing NAT traversal techniques in lieu of a server of the architecture.
Figure 6:
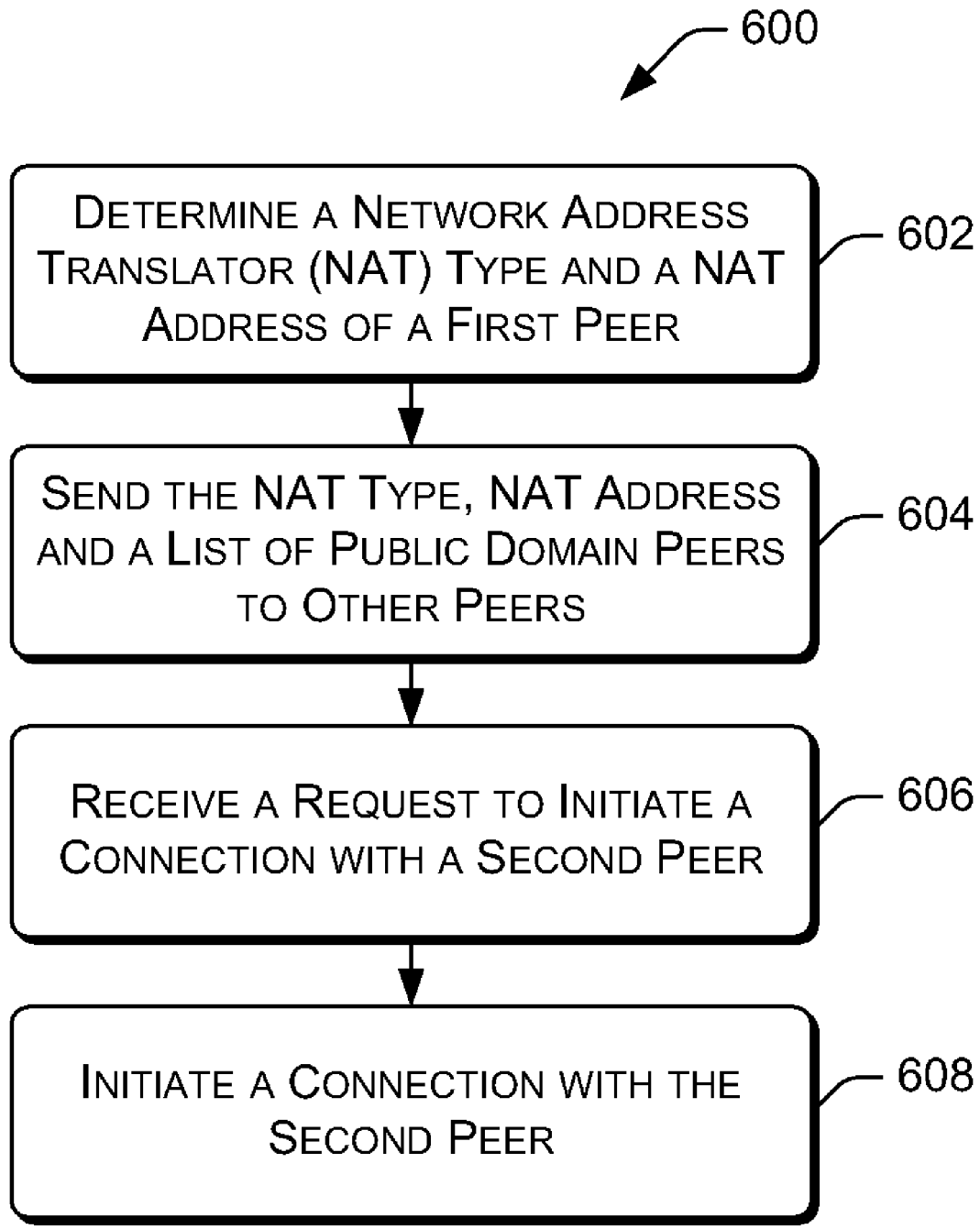
Figure 7:
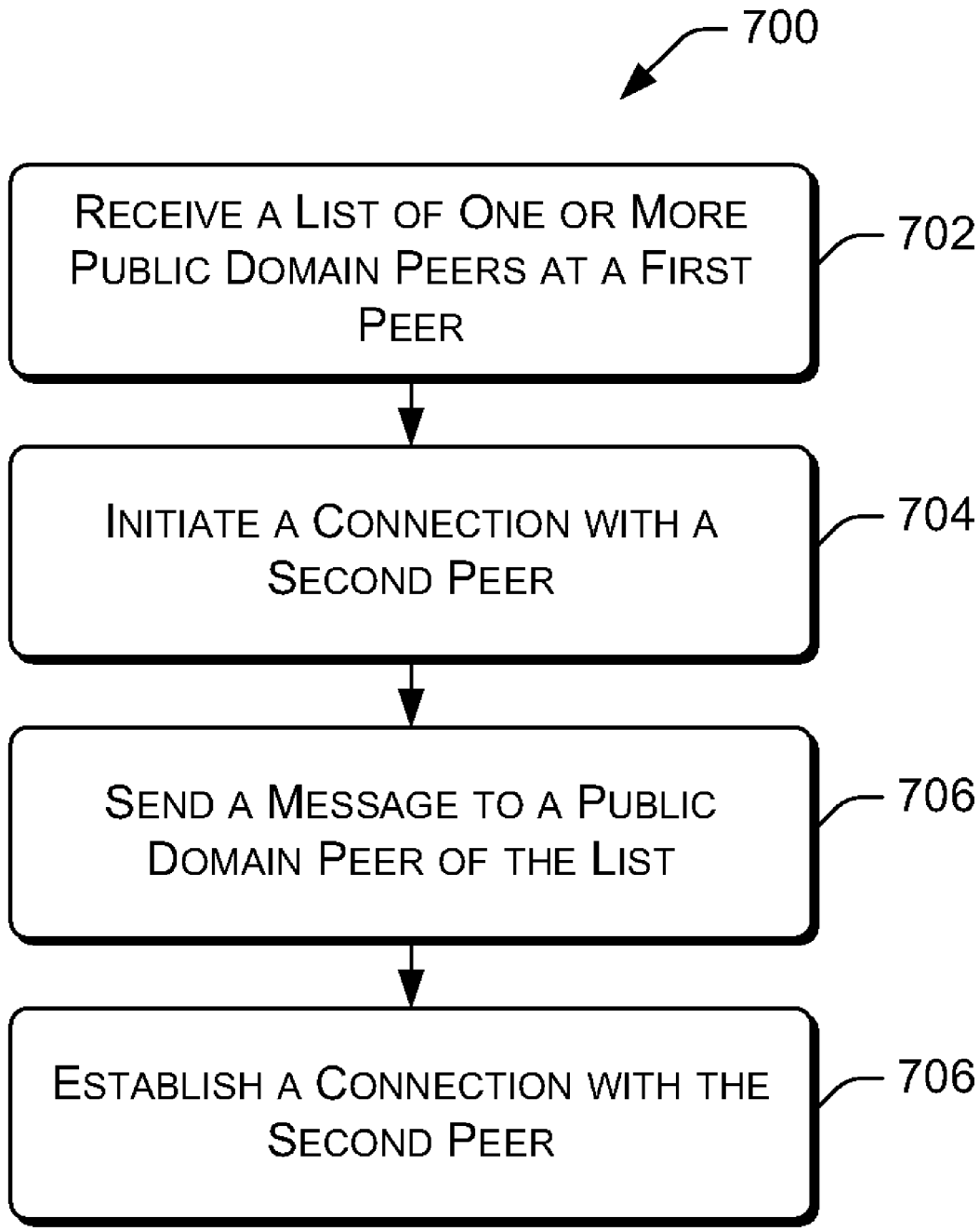

FIGS. 5-7 depict illustrative processes 500, 600 and 700 leveraging a public domain peer of a peer-to-peer architecture for performing NAT traversal techniques in lieu of a server of the architecture. These processes, as well as other processes described throughout, are each illustrated as a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The computer-executable instructions are stored on computer-readable media. Computer-readable media may include, for example, computer storage media and communications media. Computer storage media is configured to store data on a physical memory storage device, while communications media is not configured to store data on a physical memory storage device. Computer storage media includes volatile and non-volatile, removable and non-removable media implemented in any method or technology for storage of information, such as computer readable instructions, data structures, program modules, or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission memory medium that can be used to store information for access by a computing device. Computer readable storage media does not include modulated data signals, carrier waves or other communication media. The order in which the operations are described is not intended to be construed as a limitation, and any number of the described operations can be combined in any order and/or in parallel to implement the process. The computer-executable instructions may be stored using any form of computer-readable media.

Process 500 includes operation 502, which represents a first peer that resides behind a NAT or firewall executing a Simple Traversal of User Datagram Protocol through Network Address Translators (STUN) protocol to determine a NAT type and NAT address associated with the NAT or firewall. Next, the first peer records a public domain peer to a distributed STUN server list at operation 504. For instance, the first peer may record the public domain peer to the list if the first peer and the public domain peer are connected to one another or have previously been connected with one another.

Operation 506, meanwhile, represents that the first peer sends: (i) contact information associated with the first peer, and (ii) the distributed STUN server list to one or more other peers of the peer-to-peer architecture. At operation 508, the first peer receives a message from a public domain peer of the distributed STUN server list to, the message requesting that the first peer initiate a connection with a second peer of the architecture. At operation 510, the first peer initiates a connection with the second peer. At least in part based on operation 510, the first peer establishes a connection with the second peer at operation 512.

FIG. 6 illustrates 600, which includes operation 602. Here, a peer of a peer-to-peer architecture determines a NAT type and address associated with the peer. For instance, the peer may determine the NAT type and address via execution of a STUN protocol or otherwise. At operation 604, the first peer sends (e.g., via a gossip-based protocol or otherwise) the determined NAT type and address and a list of one or more public domain peers of the architecture to one or more other peers. Operation 606, meanwhile, represents receiving a request from a public domain peer to initiate a connection with a second peer of the architecture. Next, operation 608 represents initiating a connection with the second peer. At least in part based on the initiating of the connection, the peers may establish a connection with one another.

Finally, FIG. 7 illustrates process 700 that includes operation 702, which comprises receiving, at a first peer, a list of one or more public domain peers of a peer-to-peer architecture on a first peer of the architecture. These peers may comprises public domain peers that a second peer has previously been connected with. Next, operation 704 represents that the first peer initiates a connection with the second peer. Operation 706 then represents that the first peer may send a message to a public domain peer of the received list. In some instances, this message requests that the public domain peer instruct the second peer to initiate a connection with the first peer. At least in part based on the initiating of the connection and the sending of the message, operation 708 establishes a connection between the first and second peers.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable media, where the media is not a signal, storing computer-executable instructions that, when executed on one or more processors of a first peer in a peer-to-peer architecture, perform acts comprising:
   executing a Simple Traversal of User Datagram Protocol through Network Address Translators (STUN) protocol to detect a NAT type and NAT address of the first peer;
   recording a second peer of the peer-to-peer architecture to a distributed STUN server list stored on the first peer, the second peer having a NAT type of Open Internet Protocol (IP);
   sending, to multiple other peers of the peer-to-peer architecture and via a gossip-based protocol: (i) the NAT type of the first peer; (ii) the NAT address of the first peer; (iii) an IP address of the first peer, and (iv) the distributed STUN server list that includes the second peer;
   receiving, from the second peer having the NAT type of Open IP, a request to initiate a connection with a third peer of the peer-to-peer architecture;
   responsive to the receiving of the message, initiating a connection with the third peer; and
   responsive to the initiating of the connection with the third peer, establishing a connection with the third peer.

2. The one or more computer-readable media of claim 1, wherein the distributed STUN server list also includes multiple other peers of the peer-to-peer architecture having NAT types of Open IP, and further storing computer-executable instructions that, when executed on the one or more processors, perform an act comprising receiving a request to initiate the connection with the third peer from one or more of the multiple other peers having NAT types of Open IP included in the distributed STUN server list.

3. One or more computer-readable media, where the media is not a signal, storing computer-executable instructions that, when executed on one or more processors of a first peer in a peer-to-peer architecture, perform acts comprising:
   determining a Network Address Translator (NAT) type and a NAT address associated with the first peer;
   sending the determined NAT type, the determined NAT address and a list including one or more known public domain peers to multiple other peers of the peer-to-peer architecture;
   receiving, from a public domain peer of the list, a request to initiate a connection with a second peer of the peer-to-peer architecture, wherein the second peer sends a message to the public domain peer of the list, the message requesting that the public domain peer instruct the first peer to initiate the connection with the second peer, and wherein if the public domain peer does not respond to the message, then the second peer sends another message to: (i) another public domain peer of the list of one or more known public domain peers, or (ii) a Simple Traversal of User Datagram Protocol through Network Address Translators (STUN) server of the peer-to-peer architecture, the another message requesting that the another peer on the list or the STUN server instruct the first peer to initiate a connection with the second peer; and
   responsive to the receiving of the request, initiating a connection with the second peer.

4. One or more computer-readable media as recited in claim 3, wherein the determining of the NAT type and the NAT address associated with the first peer comprises executing a Simple Traversal of User Datagram Protocol through Network Address Translators (STUN) protocol to detect the NAT type and the NAT address.

5. One or more computer-readable media as recited in claim 3, wherein the first peer also sends an internal IP address of the first peer to the multiple other peers of the peer-to-peer architecture.

6. One or more computer-readable media as recited in claim 3, wherein at least one of the known public domain peers has a NAT type of Open Internet Protocol (IP).

7. One or more computer-readable media as recited in claim 3, wherein at least one of the public domain peers is not hidden behind a NAT and is not hidden behind a firewall.

8. One or more computer-readable media as recited in claim 3, wherein the sending comprises periodically sending the determined NAT type, the determined NAT address and the list including one or more known public domain peers to the multiple other peers via a gossip-based protocol.

9. One or more computer-readable media as recited in claim 3, further storing computer-executable instructions that, when executed on the one or more processors, perform an act comprising establishing a connection with the second peer based at least in part on the initiating of the connection with the second peer.

10. One or more computer-readable media, where the media is not a signal, storing computer-executable instructions that, when executed on one or more processors, perform acts comprising:
   receiving, at a first peer of a peer-to-peer architecture, a list of one or more public domain peers of the peer-to-peer architecture that have previously been connected with a second peer of the peer-to-peer architecture;
   initiating a connection with the second peer of the peer-to-peer architecture;
   sending a message to a public domain peer of the list of one or more public domain peers, the message requesting that the public domain peer instruct the second peer to initiate a connection with the first peer, wherein if the public domain peer does not respond to the message, then the second peer sends another message to: (i) another public domain peer of the list of one or more known public domain peers, or (ii) a Simple Traversal of User Datagram Protocol through Network Address Translators (STUN) server of the peer-to-peer architecture, the another message requesting that the another peer on the list or the STUN server instruct the first peer to initiate a connection with the second peer; and at least in part due to the sending of the message to the public domain peer, establishing a connection between the first and second peers.

11. One or more computer-readable media as recited in claim 10, wherein at least one of the one or more public domain peers has a Network Address Translators (NAT) type of Open Internet Protocol (IP).

12. One or more computer-readable media as recited in claim 10, wherein at least one of the one or more public domain peers is free from concealment by a Network Address Translator (NAT) and is free from concealment by a firewall.

13. One or more computer-readable media as recited in claim 10, further storing computer-executable instructions that, when executed on the one or more processors, perform an act comprising performing a Simple Traversal of User Datagram Protocol through Network Address Translators (STUN) protocol to detect a NAT type and a NAT address of the first peer.

14. One or more computer-readable media as recited in claim 10, wherein the list is received from the second peer via a gossip-based protocol.

15. One or more computer-readable media as recited in claim 10, wherein the list received at the first peer comprises a distributed Simple Traversal of User Datagram Protocol through Network Address Translators (STUN) server list.

16. One or more computer-readable media as recited in claim 10, further storing computer-executable instructions that, when executed on the one or more processors, perform act comprising:
   maintaining, at the first peer of the peer-to-peer architecture, a list of one or more public domain peers of the peer-to-peer architecture that have previously been connected with the first peer of the peer-to-peer architecture; and
   sending, from the first peer via a gossip-based protocol and to multiple other peers of the peer-to-peer architecture, the list of one or more public domain peers that have previously been connected with the first peer.

17. One or more computer-readable media as recited in claim 10, further storing computer-executable instructions that, when executed on the one or more processors, perform an act comprising sending, from the first peer via a gossip-based protocol and to multiple other peers of the peer-to-peer architecture, a Network Address Translators (NAT) type of the first peer, a NAT address of the first peer and an internal Internet Protocol (IP) address of the first peer.

18. One or more computer-readable media as recited in claim 10, further storing computer-executable instructions that, when executed on the one or more processors, perform act comprising:
   maintaining, at the first peer of the peer-to-peer architecture, a list of one or more public domain peers of the peer-to-peer architecture that have previously been connected with the first peer of the peer-to-peer architecture;
   periodically sending a keep-alive message from the first peer and to a public domain peer of the list of one or more public domain peers that have previously been connected with the first peer.

19. One or more computing devices, comprising:
   one or more processors; and
   the one or more computer-readable media storing the computer-executable instructions as recited in claim 10.

* * * * *